UNITED STATES PATENT OFFICE 2,244,449

COATING AND METHOD OF MAKING THE SAME

Charles Ellis, Victoria, British Columbia, Canada

No Drawing. Application November 30, 1938,
Serial No. 243,289

2 Claims. (Cl. 134—46)

My invention relates to a cream-like substance which may be applied by dipping, spraying, or painting to surfaces suited to receive the same so as to cause the surface to become impermeable to water and resistive to the action of the weather, weak acids and weak alkalies, the resulting surface being enamel-like in hardness, in either a glossy or flat finish, and an important object of my invention is to provide a method of obtaining this cream-like substance, as well as a method or process of treating a surface to obtain the effects stated.

Other important objects and advantages of my invention will be apparent from a reading of the following description taken in connection with the examples given for illustrative purposes, wherein preferred embodiments of my invention are set forth.

The cream-like substance of the present invention may be applied to the surfaces of stone, clay products, cement products, stucco, old lime plaster, plaster board, paper board, and combinations of these, and an important aspect of the invention is that the cream-like substance is to be produced and applied cold on either the outer or interior surfaces of buildings and other articles having surfaces of the kind described above. The resultant coating can be built up by several applications to any desired thickness and can be marked off in any design or finishing. In a high gloss finish the coating can take the place of tiles in bathrooms, of floors, kitchen sinks, and hearths, to mention a few examples.

The cream-like substance of the present invention contains the following ingredients:

Calcium chloride, Portland cement, chromium oxide, calcium stearate, and water. Any coloring material which is devoid of and does not contain either lead or zinc oxide, may be used in the stead of and in the place of the mentioned chromium oxide, and in the same relative proportions as are called for by the chromium oxide relative to the Portland cement, such as iron oxides, cobalt or magnesium oxides, and aluminum oxides.

While a certain amount of latitude in the relative proportions of the stated ingredients is permitted to accommodate particular conditions, the following is a preferred example of the substance of the present invention suitable by relatively small modifications for a large number of applications:

I. Calcium chloride in any quantity measured by weight mixed with water. The weight of the water used for this mixture must be two times the weight of the calcium chloride.

II. Portland cement—100 parts by volume.
Chromium oxide—10 parts by volume.
Calcium stearate—½ to 1 part by volume.

III. 45 parts by volume of water, 5 parts by volume of Solution I.

IV. The resultant of the mixture of Portland cement, chromium oxide, and calcium stearate, wetted with Item III.

The method of preparing the above embodiment of the product of the invention is substantially as follows:

First a mixture is formed by dissolving any quantity of calcium chloride in two times its weight of clean fresh water. A second mixture is formed by taking 5 parts by volume, of the resultant of the foregoing admixing it with substantially 45 parts by volume of the water.

Then 100 parts by volume of Portland cement, 10 parts by volume of chromium oxide, and substantially ½ to 1 part by volume of calcium stearate are mixed together into a cream by wetting the resultant of the mixture with the resultant of the second mentioned mixture. The resultant is immediately agitated quickly for approximately 7 minutes, not longer than 8 minutes, nor for a shorter time than 6 minutes.

The process of coating a surface in accordance with the present invention comprises substantially the following steps:

(1) Make the surface to which the substance is to be applied damp by soaking it with water.

(2) Apply the cream-like substance of the invention and permit the same to set for several hours.

(3) After the cream-like substance has set, it is kept moist for several days at a temperature between 35 degrees Fahrenheit and 70 degrees Fahrenheit, so as to cure the coating.

It is to be observed that the coating will be most glossy when it has been cured at a temperature of approximately 70 degrees Fahrenheit in a damp, humid atmosphere and will be least glossy when it is cured at a temperature below 40 degrees Fahrenheit. In any case the coating must be kept damp for several days, that is, for a period ranging from 96 to 144 hours.

Although I have shown and described herein preferred embodiments of my invention, it is to be definitely understood that I do not desire to limit the invention thereto, but any change or changes may be made in the materials, and in the method.

Having described the invention, what is claimed as new is:

1. A liquid composition of creamy consistency adapted to form an enamel-like coating on an unpolished non-metallic surface when said composition is applied while said surface is damp and allowed to set and cure while kept damp, said composition consisting of the product obtained by mixing together substantially 100 parts by volume of Portland cement, 10 parts by volume of pigment selected from the group consisting of chromium oxide, iron oxide, cobalt oxide, magnesium oxide, and aluminum oxide, from ½ to 1 part by volume of calcium stearate, and substantially 45 parts by volume of an aqueous solution of calcium chloride obtained from dissolving a quantity of calcium chloride in twice the quantity by weight of water.

2. The process of making a liquid coating composition of the character described, said process consisting in mixing together substantially 100 parts by volume of Portland cement, 10 parts by volume of coloring matter selected from the group consisting of chromium oxide, iron oxide, cobalt oxide, magnesium oxide, and aluminum oxide, and substantially ½ to 1 part by volume of calcium stearate, and wetting the resultant with substantially 45 parts by volume of aqueous solution of calcium chloride obtained by dissolving calcium chloride in substantially twice the amount thereof by weight of water, and agitating the resultant until a creamy consistency is obtained.

CHARLES ELLIS.